US012075932B1

(12) United States Patent
Sharpnack

(10) Patent No.: US 12,075,932 B1
(45) Date of Patent: Sep. 3, 2024

(54) GOLF BALL BEVERAGE CONTAINER

(71) Applicant: Mark Sharpnack, Wickliffe, OH (US)

(72) Inventor: Mark Sharpnack, Wickliffe, OH (US)

( * ) Notice: Subject to any disclaimer, the term of this patent is extended or adjusted under 35 U.S.C. 154(b) by 133 days.

(21) Appl. No.: 17/888,599

(22) Filed: Aug. 16, 2022

(51) Int. Cl.
*A47G 19/22* (2006.01)
*B67C 11/02* (2006.01)

(52) U.S. Cl.
CPC .......... *A47G 19/2227* (2013.01); *B67C 11/02* (2013.01)

(58) Field of Classification Search
CPC .... A47G 19/2227; B65D 11/02; B65D 81/36; B65D 81/365
USPC .......... D3/202; D7/901
See application file for complete search history.

(56) References Cited

U.S. PATENT DOCUMENTS 4,164,284 A * 8/1979 Witt .......... B65D 11/02 206/217
D289,355 S * 4/1987 Paulides .......... D9/519
5,277,642 A 1/1994 Dorta
5,638,982 A 6/1997 Spector
5,662,241 A * 9/1997 Sorensen .......... B65D 81/365 220/630
D404,195 S 1/1999 Beals
D474,335 S 5/2003 von Schmidt
9,408,779 B2 * 8/2016 Stewart .......... A61J 9/0607
9,487,336 B2 11/2016 Tussy
9,914,031 B2 3/2018 Vrhel
9,962,023 B1 * 5/2018 Lauritano .......... B65D 47/06
10,532,877 B2 * 1/2020 Price .......... B65D 81/3879
2010/0041937 A1 * 2/2010 Gonzalez .......... F23G 7/003 220/601
2010/0051107 A1 * 3/2010 Crawford .......... A01G 25/14 137/1

FOREIGN PATENT DOCUMENTS

WO 2004101372 11/2004

OTHER PUBLICATIONS https://www.amazon.com/Liquor-Stainless-Leakproof-Camping-Wedding/ Brand Jiuzhu, 10 pcs Hip Flask for Liquor Black 6oz Stainless Steel Leakproof with Funnel Date first available May 20, 2021 (Year: 2021).*

* cited by examiner

*Primary Examiner* — Chun Hoi Cheung
(74) *Attorney, Agent, or Firm* — Kyle A. Fletcher, Esq.

(57) ABSTRACT

The golf ball beverage container may comprise a flask and a funnel. The flask may resemble a golf ball in size, shape, and coloration. A screw cap may be removed from the flask to reveal a hollow interior that may be filled with a liquid. As a non-limiting example, the liquid may be a beverage. With the screw cap in place the liquid may be transported within the flask without spilling. The funnel may resemble a golf tee. The funnel may be operable to guide the liquid into a head of the golf tee through a hollow center of the golf tee and into the flask as the liquid is poured.

18 Claims, 6 Drawing Sheets

GOLF BALL BEVERAGE CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of golfing novelties and beverage flasks, more specifically, a golf ball beverage container.

SUMMARY OF INVENTION

The golf ball beverage container may comprise a flask and a funnel. The flask may resemble a golf ball in size, shape, and coloration. A screw cap may be removed from the flask to reveal a hollow interior that may be filled with a liquid. As a non-limiting example, the liquid may be a beverage. With the screw cap in place the liquid may be transported within the flask without spilling. The funnel may resemble a golf tee. The funnel may be operable to guide the liquid into a head of the golf tee through a hollow center of the golf tee and into the flask as the liquid is poured.

An object of the invention is to provide a flask that resembles a golf ball in size, shape, and coloration.

Another object of the invention is to provide a flask that comprises a flask body and a screw cap that threadedly couples to the flask body.

A further object of the invention is to provide a funnel that resembles a golf tee.

Yet another object of the invention is to provide a rubber ring around the top of the funnel such that the funnel may be inverted and used as a tool to remove the screw cap.

These together with additional objects, features and advantages of the golf ball beverage container will be readily 14 apparent to those of ordinary skill in the art upon reading the following detailed description of the presently preferred, but nonetheless illustrative, embodiments when taken in conjunction with the accompanying drawings.

In this respect, before explaining the current embodiments of the golf ball beverage container in detail, it is to be understood that the golf ball beverage container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the golf ball beverage container.

It is therefore important that the claims be regarded as including such equivalent construction insofar as they do not depart from the spirit and scope of the golf ball beverage container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
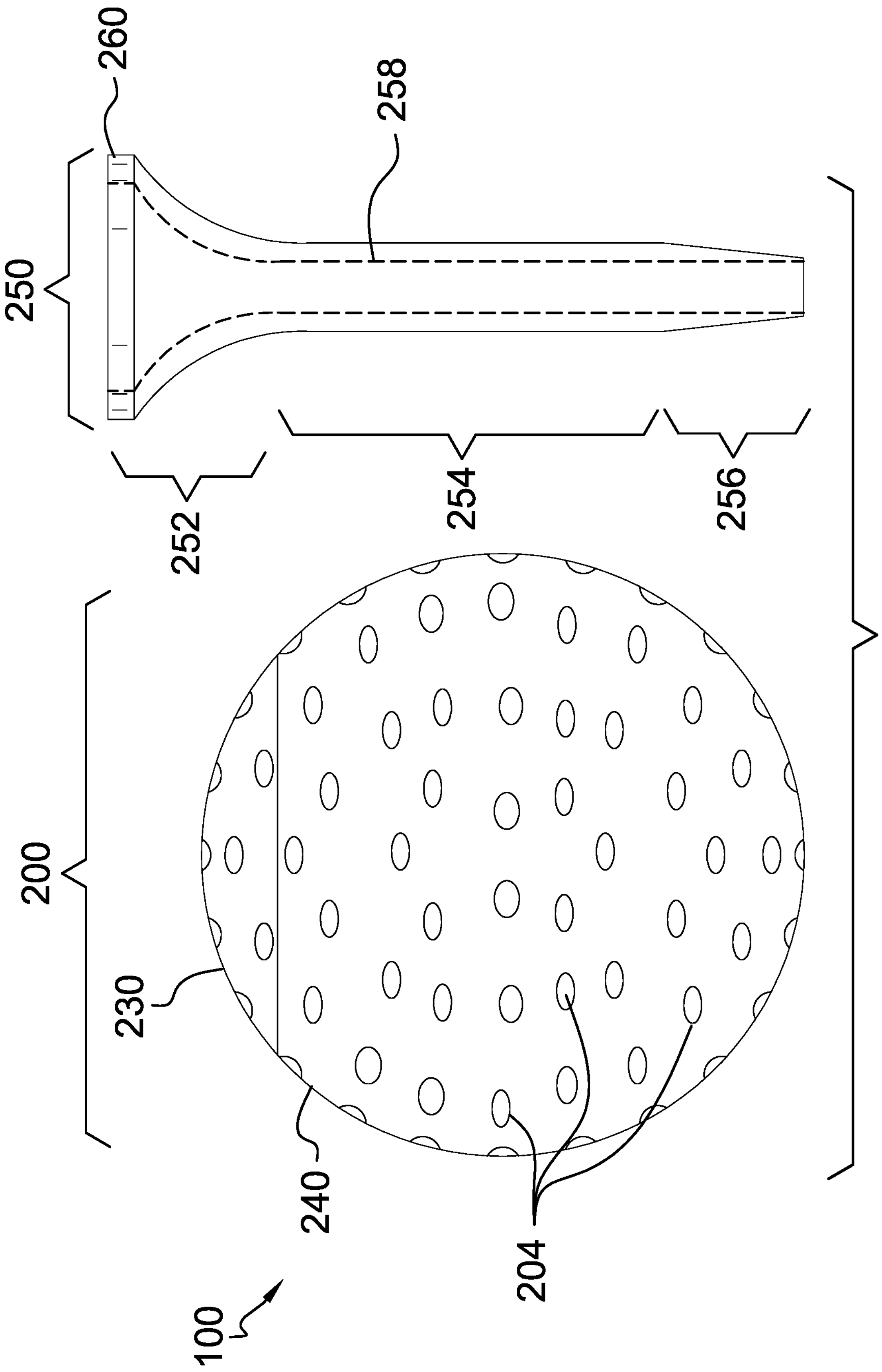
FIG. 1 is a front view of an embodiment of the disclosure.
Figure 2:
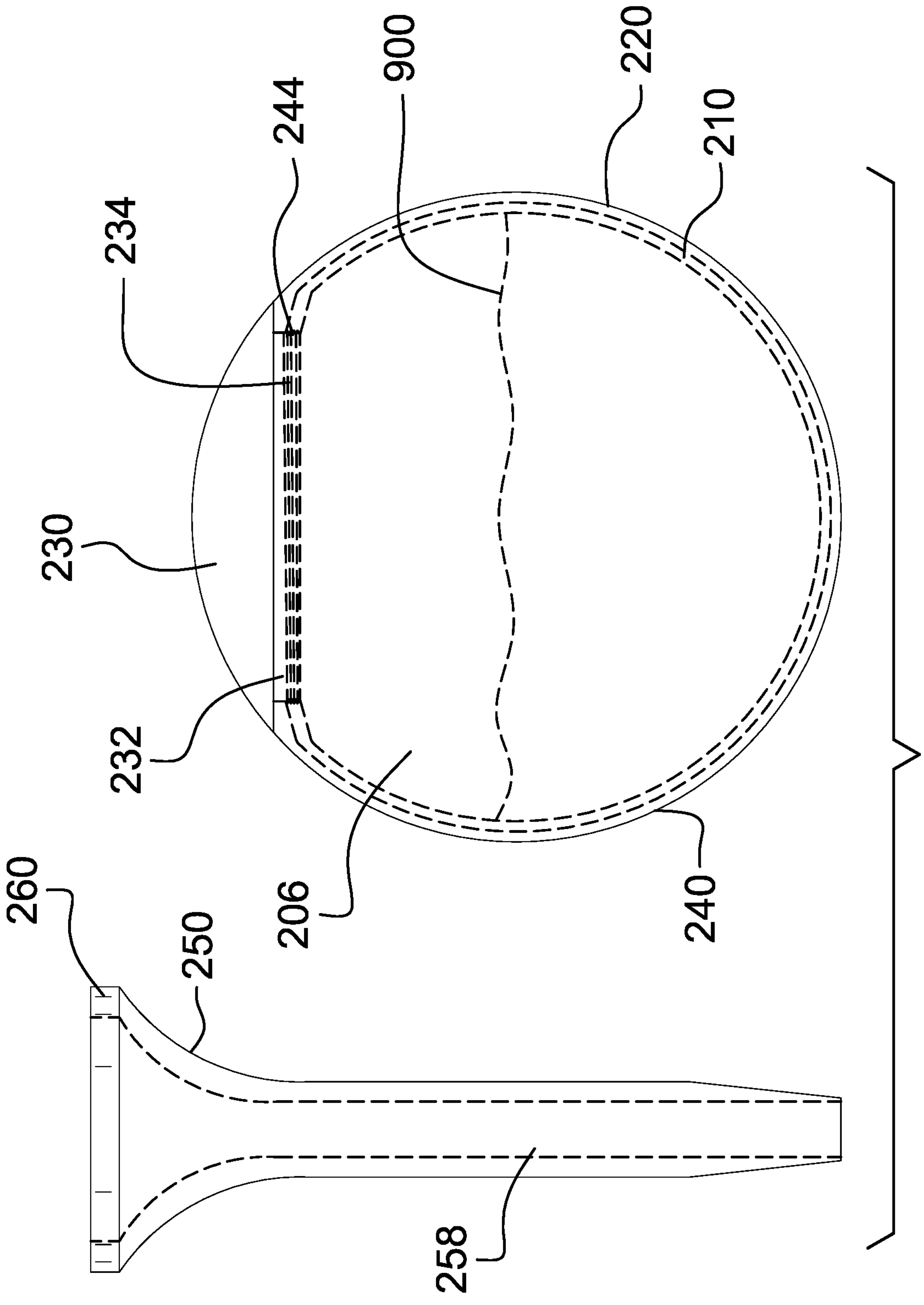
FIG. 2 is a rear view of an embodiment of the disclosure.
Figure 3:
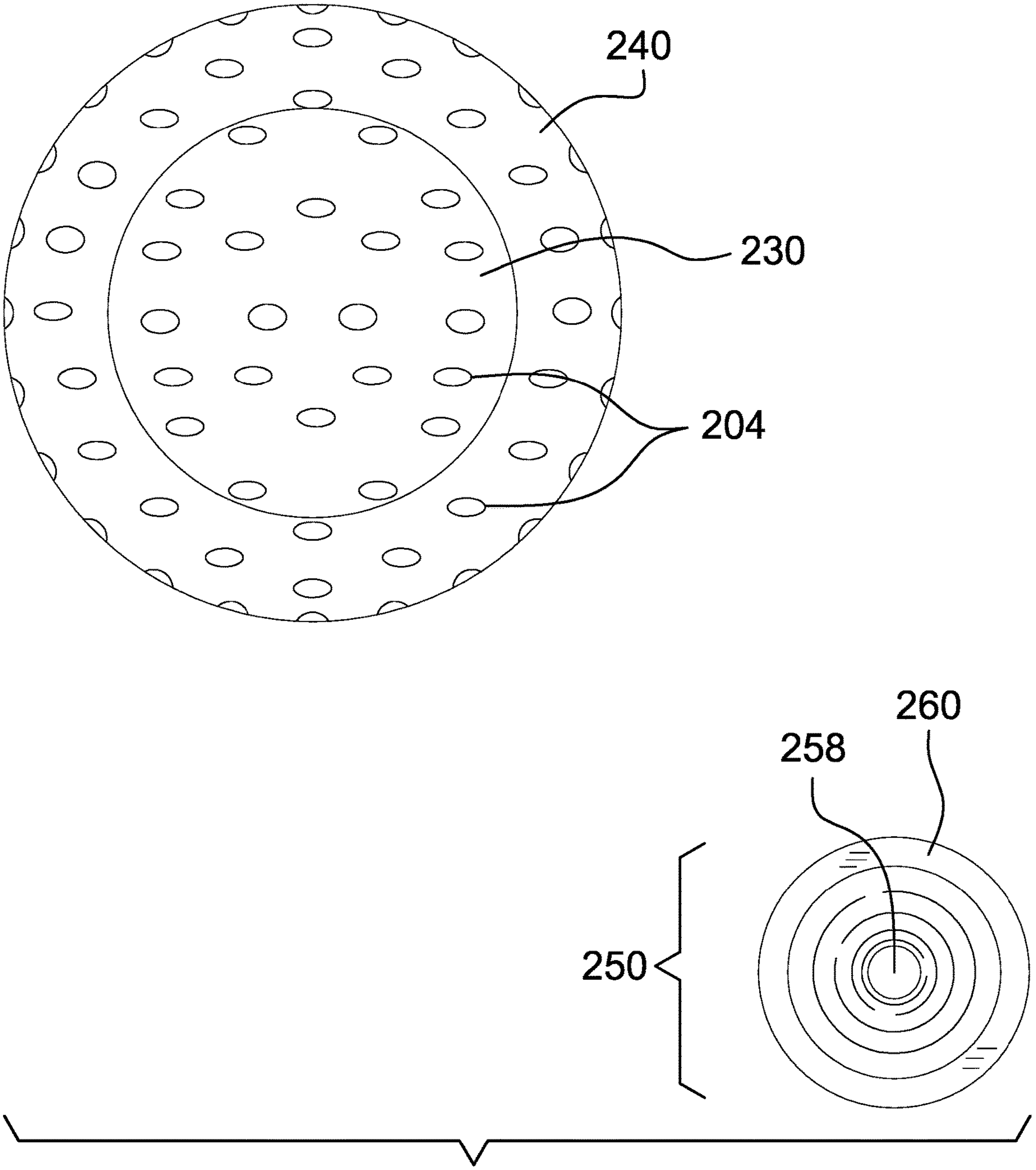
FIG. 3 is a top view of an embodiment of the disclosure.
Figure 4:
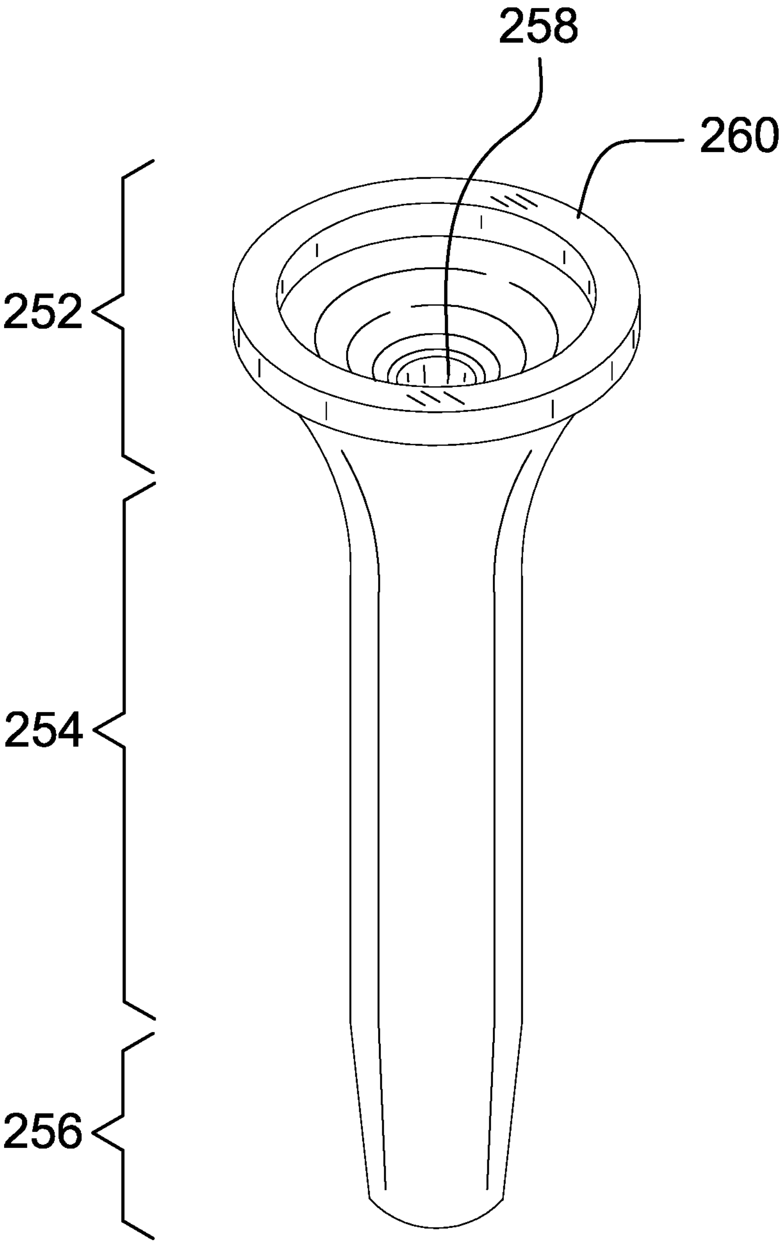
FIG. 4 is a detail view of an embodiment of the disclosure illustrating the funnel.
Figure 5:
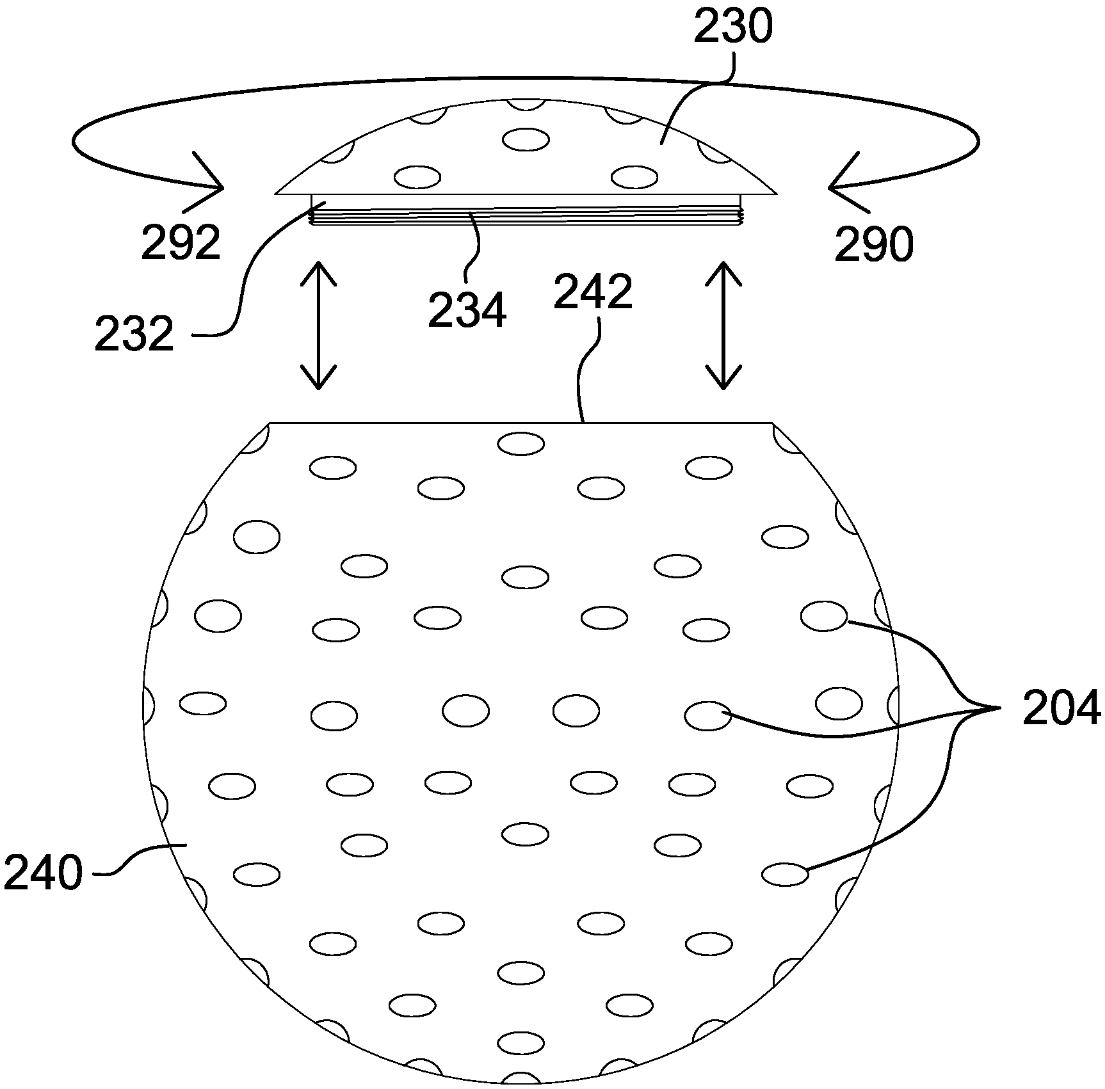
FIG. 5 is a detail view of an embodiment of the disclosure illustrating the flask when open.
Figure 6:
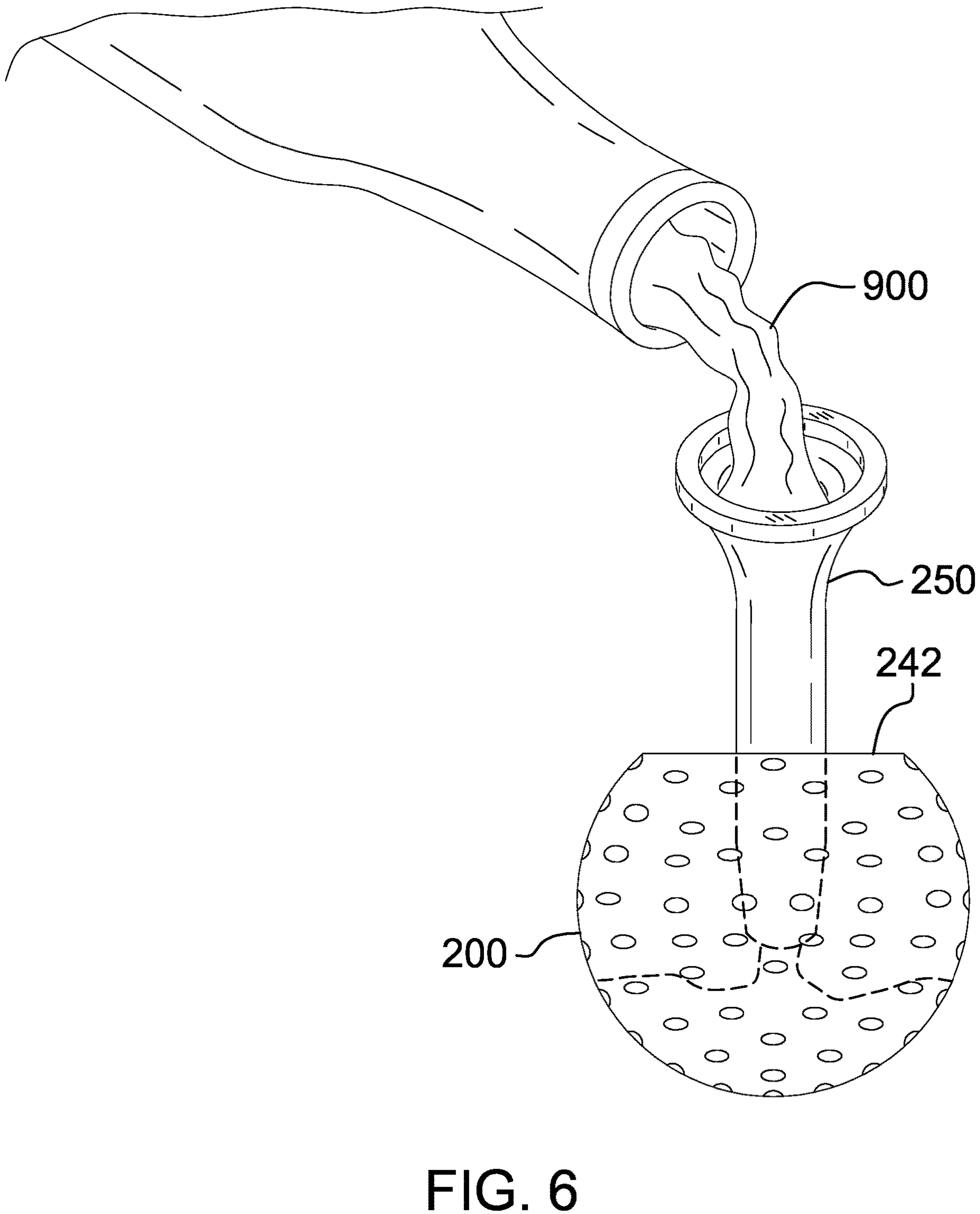
FIG. 6 is an in-use view of an embodiment of the disclosure.

Detailed reference will now be made to a first potential embodiment of the disclosure, which is illustrated in FIGS. 1 through 6.

The golf ball beverage container 100 (hereinafter invention) comprises a flask 200 and a funnel 250. The flask 200 may resemble a golf ball in size, shape, and coloration. A screw cap 230 may be removed from the flask 200 to reveal a hollow interior 206 that may be filled with a liquid 900. As a 8 non-limiting example, the liquid 900 may be a beverage. With the 9 screw cap 230 in place the liquid 900 may be transported within the flask 200 without spilling. The funnel 250 may resemble a golf tee. The funnel 250 may be operable to guide the liquid 900 into a head 252 of the golf tee through a hollow center 258 of the golf tee and into the flask 200 as the liquid 900 is poured.

The flask 200 may be spherical and may be regulation size for a golf ball. Specifically, the flask 200 may have a diameter of at least 1.680 inches. The flask 200 may comprise a plurality of dimples 204 dispersed in a symmetrical pattern on the surface 19 of the flask 200 to further enhance a golf ball appearance. Coloring of the flask 200 may mimic the golf ball appearance. As non-limiting examples, the flask 200 may be white, yellow, or a neon color. The flask 200 may comprise indicia on an outer covering 220 of the flask 200. As non-limiting examples, the indicia may be textual or graphical and may convey one or more messages and/or one or more logos such as golf ball markings, contact information, marketing messages, quotations, and humorous material.

The flask 200 may comprise an inner lining 210 surrounded by the outer covering 220. The inner lining 210 may define the hollow interior 206 where the liquid 900 may be stored. The 8 flask 200 may be thermally insulated by the outer covering 220. The hollow interior 206 may have a capacity of at least 1.25 fluid ounces. In some embodiments, the inner lining 210 may be made of stainless steel.

As non-limiting examples, the outer covering 220 may be made of Surlyn or urethane.

The flask 200 may comprise a flask body 240 and the screw cap 230. The screw cap 230 may be removed to reveal a top aperture 242 and to provide access to the hollow interior 206 of the flask 200. The screw cap 230 may comprise a neck 232 that extends downward from the screw cap 230. The neck 232 may comprise an external thread 234 that mates with an internal thread 244 surrounding the top aperture 242 of the flask body 240 such that the screw cap 230 may be coupled to and decoupled from the flask body 240 by rotating the screw cap 230 in a first rotational direction 290 and a second rotational direction 292, respectively. In some embodiments, an O-ring gasket surrounding the neck 232 may seal the interface between the screw cap 230 and the flask body 240.

The funnel 250 may comprise the head 252, a shaft 254, and a tip 256 which resemble the golf tee. The head 252 may be wider than the shaft 254 and the tip 256 may be narrower than the shaft 254. The funnel 250 may comprise the hollow center 258 running longitudinally through the funnel 250 from the head 252 to the tip 256. The hollow center 258 may be flared at the head 252 to collect the liquid 900 being poured into the flask 200.

The top of the funnel 250 may be surrounded by a rubber ring 260 so that the funnel 250 may be inverted and used as a tool to rotate the screw cap 230 of the flask 200.

In use, the flask 200 may be opened by rotating the screw cap 230 in the second rotational direction 292. The liquid 900 may be poured into the hollow interior 206 of the flask 200 using the funnel 250 to guide the liquid 900 into the flask body 240. The flask 200 may be closed by replacing the screw cap 230 and by rotating the screw cap 230 in the first rotational direction 290. The flask 200 may be transported without spilling the liquid 900. To consume the liquid 900, the screw cap 230 may be removed and the liquid 900 may be poured out of the flask body 240.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

As used in this disclosure, an “aperture” may be an opening in a surface or object. Aperture may be synonymous with hole, slit, crack, gap, slot, or opening.

As used herein, the words “couple”, “couples”, “coupled” or “coupling”, may refer to connecting, either directly or indirectly, and does not necessarily imply a mechanical connection.

As used in this disclosure, a “diameter” of an object is a straight line segment that passes through the center (or center axis) of an object. The line segment of the diameter is terminated at the perimeter or boundary of the object through which the line segment of the diameter runs.

As used in this disclosure, a “gasket” may be an elastomeric material that is placed between a first surface and a second surface for the purpose of creating a liquid or gas impermeable seal between the first surface and the second surface or preventing the first surface from damaging the second surface (or vice versa).

As used in this disclosure, the term “indicia” may refer to a set of markings that identify a sentiment.

As used in this disclosure, the word “interior” may be used as a relational term that implies that an object is located or contained within the boundary of a structure or a space.

As used herein, the words “invert”, “inverted”, or “inversion” may refer to an object that has been turned inside out or upside down or to the act of turning an object inside out or upside down.

As used herein, the word “longitudinal” or “longitudinally” may refer to a lengthwise or longest direction or to a direction that is perpendicular to the lateral direction.

As used herein, “mate” may refer to a retaining, coupling, connecting, interlocking, or interfacing at a predefined interface.

As used herein, the words “printed”, “marked”, and “marking” may refer to a mark that has been made on an object. The process of making the mark may involve printing, lithography, thermal transfer, painting, embossing, molding, burning, silk-screening, drawing, etching, engraving, stenciling, stamping, spraying of pigments, or other processes which result in the controlled change of coloration and/or shape of a surface.

As used herein, “Surlyn” may refer to an ionomer resin created and trademarked by DuPont. Surlyn is a copolymer of ethylene and methacrylic acid used as a coating and packaging material. Surlyn may be used to form the exterior surface of golf balls.

As used herein, “thermally insulated/thermally insulating” may refer to a property of a material that reduces the transfer of heat through the material. “Thermal insulation” may refer to a material having the property of being thermally insulating.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A golf ball beverage container comprising:

a flask and a funnel;

wherein the flask resembles a golf ball in size, shape, and coloration;

wherein a screw cap is removed from the flask to reveal a hollow interior that is filled with a liquid;

wherein with the screw cap in place the liquid is transported within the flask without spilling;

wherein the funnel resembles a golf tee;

wherein the funnel is operable to guide the liquid into a head of the golf tee through a hollow center of the golf tee and into the flask as the liquid is poured;

wherein the flask comprises a plurality of dimples dispersed in a symmetrical pattern on a surface of the flask to further enhance a golf ball appearance.

2. The golf ball beverage container according to claim 1 wherein the flask is spherical.

3. The golf ball beverage container according to claim 2 wherein the flask has a diameter of at least 1.680 inches.

4. The golf ball beverage container according to claim 2 wherein coloring of the flask mimics the golf ball appearance.

5. The golf ball beverage container according to claim 4 wherein the flask is white, yellow, or a neon color.

6. The golf ball beverage container according to claim 5 wherein the flask comprises indicia on an outer covering of the flask.

7. The golf ball beverage container according to claim 6 wherein the indicia is textual or graphical and conveys one or more messages and/or one or more logos.

8. The golf ball beverage container according to claim 4 wherein the flask comprises an inner lining surrounded by an outer covering;

wherein the inner lining defines the hollow interior where the liquid is stored.

9. The golf ball beverage container according to claim 8 wherein the flask is thermally insulated by the outer covering.

10. The golf ball beverage container according to claim 9 wherein the hollow interior has a capacity of at least 1.25 fluid ounces.

11. The golf ball beverage container according to claim 10 wherein the inner lining is made of stainless steel.

12. The golf ball beverage container according to claim 11 wherein the outer covering is made of Surlyn or urethane.

13. The golf ball beverage container according to claim 11 wherein the flask comprises a flask body and the screw cap;

wherein the screw cap is removed to reveal a top aperture and to provide access to the hollow interior of the flask.

14. The golf ball beverage container according to claim 13 wherein the screw cap comprises a neck that extends downward from the screw cap;

wherein the neck comprises an external thread that mates with an internal thread surrounding the top aperture of the flask body such that the screw cap is coupled to and decoupled from the flask body by rotating the screw cap in a first rotational direction and a second rotational direction, respectively.

15. The golf ball beverage container according to claim 14 wherein an O-ring gasket surrounding the neck seals the interface between the screw cap and the flask body.

16. The golf ball beverage container according to claim 14 wherein the funnel comprises the head, a shaft, and a tip which resemble the golf tee;

wherein the head is wider than the shaft and the tip are narrower than the shaft.

17. The golf ball beverage container according to claim 16 wherein the funnel comprises the hollow center running longitudinally through the funnel from the head to the tip;

wherein the hollow center is flared at the head to collect the liquid being poured into the flask.

18. The golf ball beverage container according to claim 17 wherein the top of the funnel is surrounded by a rubber ring so that the funnel is operable to be inverted and used as a tool to rotate the screw cap of the flask.

* * * * *